(12) United States Patent
Hayashi et al.

(10) Patent No.: US 6,241,925 B1
(45) Date of Patent: Jun. 5, 2001

(54) METHOD OF LINING CHANNELS

(75) Inventors: Mitsutoshi Hayashi, Saitama; Mitsunori Komori, Chiba; Masato Koseki; Yuichi Banrai, both of Kanagawa; Tomoyuki Minami; Seiji Mizukami, both of Tokyo; Yasuo Miyazaki; Akira Kamide, both of Osaka; Hirohisa Tanimuro; Takeshi Uchida, both of Nara, all of (JP)

(73) Assignees: Tokyo Gas Co., Ltd., Tokyo; Osaka Bosui Construction Co., Ltd., Osaka, both of (JP)

( * ) Notice: Subject to any disclaimer, the term of this patent is extended or adjusted under 35 U.S.C. 154(b) by 0 days.

(21) Appl. No.: 09/319,110

(22) PCT Filed: Oct. 5, 1998

(86) PCT No.: PCT/JP98/04472

§ 371 Date: May 27, 1999

§ 102(e) Date: May 27, 1999

(87) PCT Pub. No.: WO99/19133

PCT Pub. Date: Apr. 22, 1999

(30) Foreign Application Priority Data

Oct. 9, 1997 (JP) .................................................. 9-276980
Apr. 27, 1998 (JP) .................................................. 10-134325

(51) Int. Cl.$^7$ ..................................................... B29C 63/34
(52) U.S. Cl. ............................. 264/35; 156/287; 156/294; 264/36.16; 264/269
(58) Field of Search ............................. 264/35, 269, 516, 264/230, 36.16, 36.17; 156/287, 294; 138/97, 98

(56) References Cited

U.S. PATENT DOCUMENTS 4,883,557 * 11/1989 Morinaga et al. .................... 156/287
5,354,586 * 10/1994 Yokoshima et al. .................. 156/287

FOREIGN PATENT DOCUMENTS 64-55225 * 3/1989 (JP) .
3-104625 * 5/1991 (JP) .
3-151225 * 6/1991 (JP) .
4-314525 * 11/1992 (JP) .

* cited by examiner

*Primary Examiner*—Mathieu D. Vargot
(74) *Attorney, Agent, or Firm*—Knobbe, Martens, Olson & Bear, LLP

(57) ABSTRACT

A method of lining a channel can be provided which includes the steps of: installing at a work site a roll having wound thereon a rigid or semirigid plastic pipe shaped initially in the form of an approximately round tube and deformed from the initial form to a flat tubular form, paying off the pipe as softened by heating from the roll installed at the work site toward an inlet of the channel to be lined, and folding the paid-off flat pipe in two to a U shape at a position between the roll and the channel inlet. The U-shaped pipe is hardened by forced cooling from outside immediately after the folding step while being restricted in shape, then inserted into the channel while being thus hardened and thereafter restored to the initial form by being inflated with heat and pressure applied from inside, whereby a lining of improved quality can be formed with an improved work efficiency.

9 Claims, 15 Drawing Sheets

FIG. 2-a
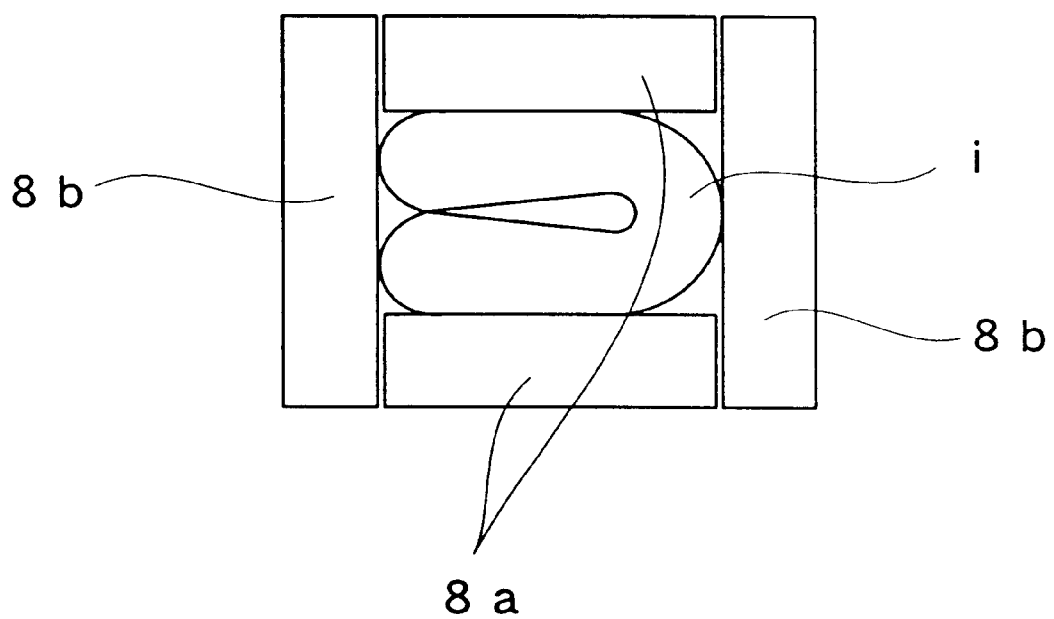

*F I G. 7*
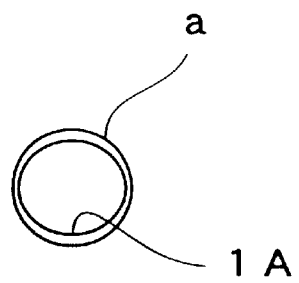
*F I G. 8*
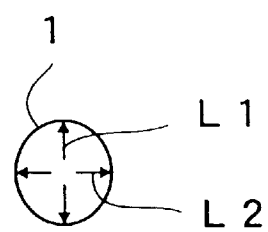
*F I G. 9*
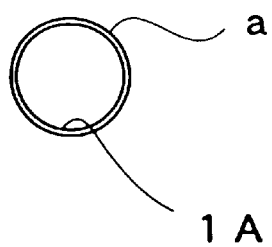

METHOD OF LINING CHANNELS

TECHNICAL FIELD

The present invention relates to a method of lining channels, and more particularly to a method of lining a channel with a rigid or semirigid plastic pipe as a lining material.

BACKGROUND ART

For example, JP-A No. 42220/1989 discloses a conventional method of lining channels. With this conventional method, a rigid or semirigid plastic pipe shaped initially in the form of a round tube is flattened, then folded in two and wound up in a folded U shape on a roll when produced in a plant. At a work site, the pipe is inserted into a channel while being paid off from the roll in a state softened by heating. The inserted pipe is inflated by applying heat and pressure thereto from inside for restoration to the round tubular form as shaped initially, forming a lining along the inner surface of the channel with the rigid or semirigid plastic pipe.

According to the lining method described, the pipe is diminished in effective outside diameter by being deformed to the folded U shape and can therefore be inserted into the channel if not fully satisfactorily, whereas since the pipe memorizes the initial shape, the U-shaped folded portion tends to become unfolded as indicated in broken lines in FIG. 6 to correspondingly increase the effective outside diameter when the pipe is so softened by heating as to be paid off from the roll, with the result that the pipe encounters increased resistance when inserted into the channel, hence a reduced work efficiency. Especially if made of polyethylene, the pipe remains somewhat elastic even when softened by heating, consequently exhibiting a marked tendency to restore its shape before deformation when released from the restraint of the deforming step.

Further if the pipe is held wound on a roll in the folded U shape before use, a folding tendency is afforded in the U-shaped folded portion of the pipe during the preservation period. The folding tendency partly becomes a permanent deformation when the pipe is inflated for restoration, preventing restoration to the form as shaped initially.

Since the bottom part X inside the U-shaped portion of the pipe (see FIG. 6) is rounded in a direction opposite to the restoration direction Y, the rounded part needs to be reversed by inflation for restoration, so that the inflation entails a considerable adverse effect. If the bottom part X has such a folding tendency and when the rounded part is reversed by inflation for restoration, numerous minute cracks are likely develop to impair the quality of the lining undesirably.

DISCLOSURE OF THE INVENTION

The main object of the present invention is to provide a method of lining a channel with a rigid or semirigid plastic pipe serving as a lining material, wherein the pipe can be inserted into the channel with reduced resistance so as to achieve an improved work efficiency.

Another object of the invention is to diminish a folding tendency in the pipe to the greatest possible extent for use in the lining method to preclude the adverse effect of the folding tendency on the quality of the lining.

Other features of the invention will become apparent from the following description.

The present invention provides a method of lining a channel including the steps of:

installing at a work site a roll having wound thereon a rigid or semirigid plastic pipe shaped initially in the form of an approximately round tube and deformed from the initial form to a flat tubular form, paying off the pipe as softened by heating from the roll installed at the work site toward an inlet of the channel to be lined, and folding the paid-off flat pipe in two to a U shape at a position between the roll and the channel inlet, the lining method being characterized in that the U-shaped pipe is hardened by forced cooling from outside immediately after the folding step while being restricted in shape, then inserted into the channel while being thus hardened and thereafter restored to the initial form by being inflated with heat and pressure applied from inside.

According to the lining method of the present invention, the pipe as U-shaped by folding is hardened by forced cooling while being restricted in shape, so that the pipe can be inserted into the channel with the U-shaped pipe portion closed, accordingly with reduced resistance, hence an improved work efficiency. Since the pipe is U-shaped by folding immediately before insertion into the channel, the U-shaped folded portion exhibits substantially no folding tendency. This eliminates the cause of minute cracking that would otherwise occur when the pipe is inflated for restoration, consequently providing a lining of high quality.

BRIEF DESCRIPTION OF THE DRAWINGS

FIG. 2-a is a diagram for illustrating a pipe U-shaped by folding and restricted in shape;

FIG. 7 is a diagram for schematically illustrating a lining formed by the method of the invention and as slightly deformed to an elliptical form;

FIG. 8 is a view in section showing a lining pipe developed anew for eliminating the deformation shown in FIG. 7;

FIG. 9 is a view in section showing a lining free from deformation;

BEST MODE OF CARRYING OUT THE INVENTION

Figure 1:
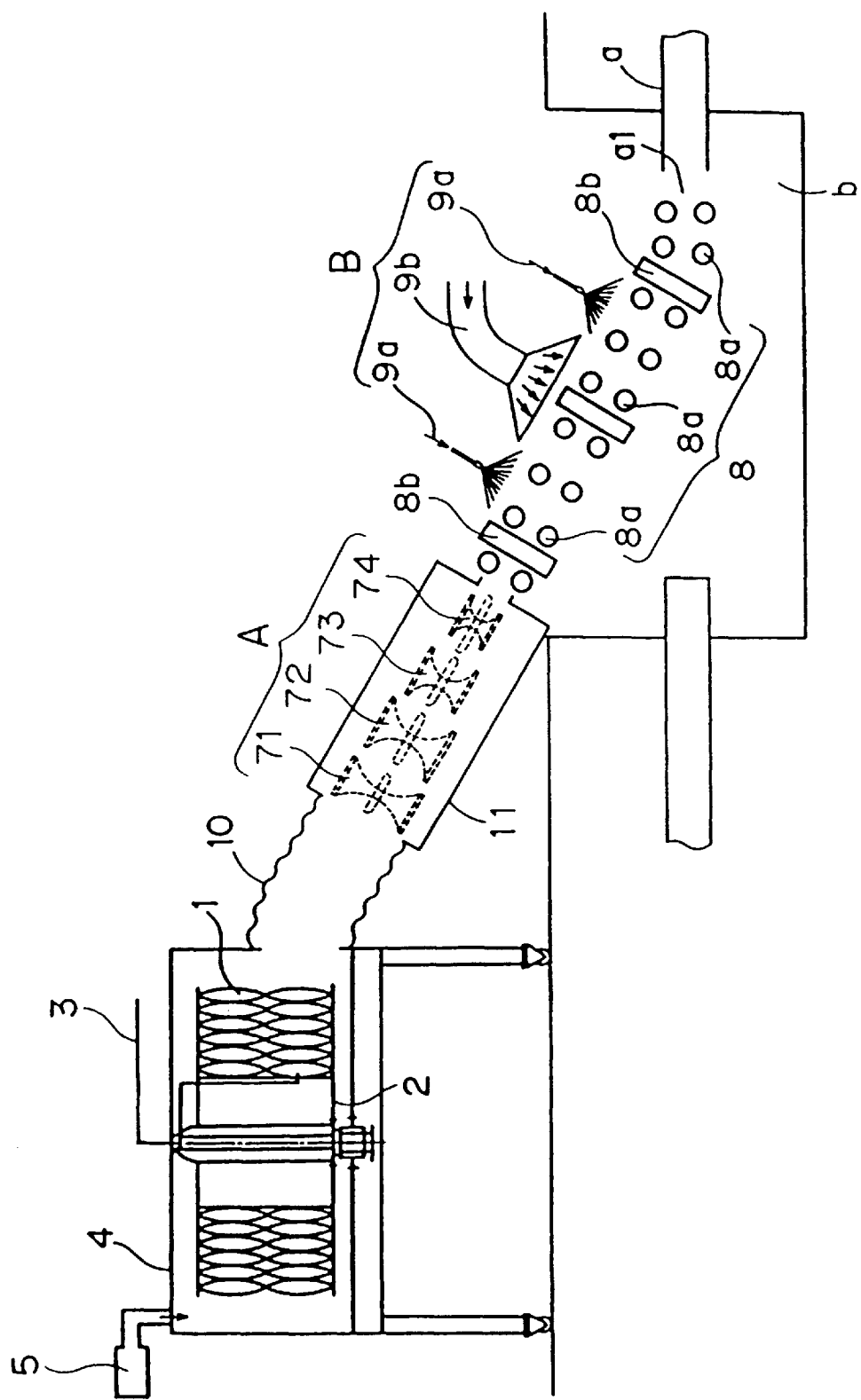
FIG. 1 is an overall diagram schematically showing an arrangement for practicing the method of the invention when the work is to be started.

Embodiments of lining method of the invention will be described below with reference to the accompanying drawings. Throughout the drawings, like parts are designated by substantially like reference numerals or symbols.

FIG. 1 is an overall diagram schematically showing an arrangement for practicing the lining method of the invention at the start of the work. A plastic pipe 1 serving as a lining material and wound on a roll 2 is installed at a work site in the vicinity of a starting shaft b.

The pipe 1 is shaped by extruding a rigid or semirigid polyethylene in the form of a round tube and has an outside diameter generally corresponding to the inside diameter of the channel a to be lined, e.g., to 90 to 100% of the inside diameter of the channel a. The pipe 1 has a wall thickness which is suitably determined in conformity with its outside diameter from the range of about 1 to about 10% of the outside diameter, e.g., about 1 to about 30 mm. The polyethylene for use in extruding the pipe 1 is 0.930 to 0.950 g/cm$^3$ in density, 120 to 250 kg/cm$^2$ in tensile strength and 100 to 130° C. in softening point. The pipe 1 may be made of other rigid or semirigid thermoplastics. Polyethylene, polypropylene or like polyolefin plastic pipes are especially desirable since they have flexibility at room temperature and are movable through bends of channels when inserted thereinto.

The pipe 1 is produced by extruding the plastic in the form of a round tube and thereafter wound up on the roll 2 while being deformed to a flat tubular form.

For lining, the flat tubular pipe 1 as wound up on the roll 2 is transported to and installed at the work site. To render the pipe 1 unwindable from the roll 2 in this installed state, the pipe 1 is softened by being heated by known heating means, for example, heating means for internally passing steam through the pipe as a heat source.

The steam is supplied to the pipe 1 through a supply line 3. The supply line 3 has one end connected to a steam supply source, e.g., a boiler, and the other end connected to the innermost of wound-up layers of the pipe 1 to supply steam from the supply source to the innermost of the wound-up pipe layers.

The steam supplied to the innermost layer of the pipe 1 passes through the pipe 1 from the innermost layer toward the outermost layer, heating the pipe 1 from inside during the passage. The pipe 1 as wound up on the roll 2 in a multiplicity of layers can be uniformly heated and softened from portion to portion over the entire length thereof by continuing the internal heating.

The pipe 1 is thus heated for softening preferably as accommodated in a heat-insulating casing 4 filled with hot air to prevent the dissipation of heat to the atmosphere and uniformly heat and soften not only the inner layer portion of the pipe section but also the outer layer portion thereof. The casing 4 is provided with a supply line 5 for hot air.

The supply of steam to the pipe 1 is discontinued after the pipe 1 has been softened by internal heating with steam to a state permitting the pipe to be unwound from the roll 2. The pipe 1 is paid off toward a channel inlet a1 having an opening in the starting shaft b.

Figure 2:
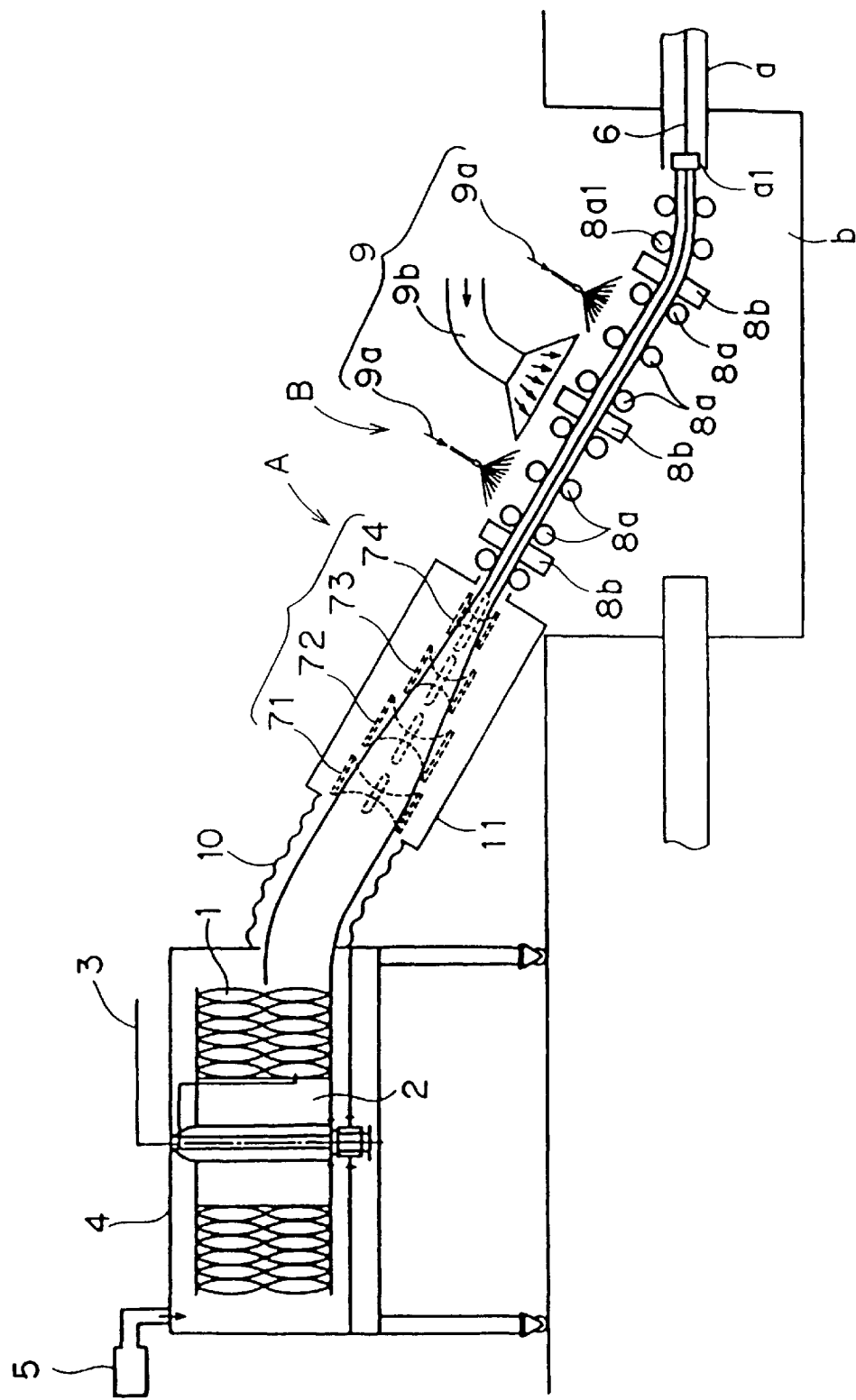
FIG. 2 is an overall diagram schematically showing the method of the invention while it is being practiced.

As shown in FIG. 2, the pipe 1 is paid off from the roll 2 by pulling a rope 6 connected to the leading end of the pipe 1. The rope 6 extends from the starting shaft b to an arrival shaft (not shown) through the channel a and has its base end wound up on a winch (not shown) installed at the latter shaft side.

While moving from the roll 2 toward the channel inlet a1, the pipe 1 passes through a deformation zone A and then through a restricting-cooling zone B in succession and is treated as specified during the passage as shown in FIG. 2.

While passing through the deformation zone A, the pipe 1 is gradually deformed from the flat tubular form to a folded U shape and has its effective outside diameter reduced to a dimension permitting insertion of the pipe into the channel a.

Figure 3:
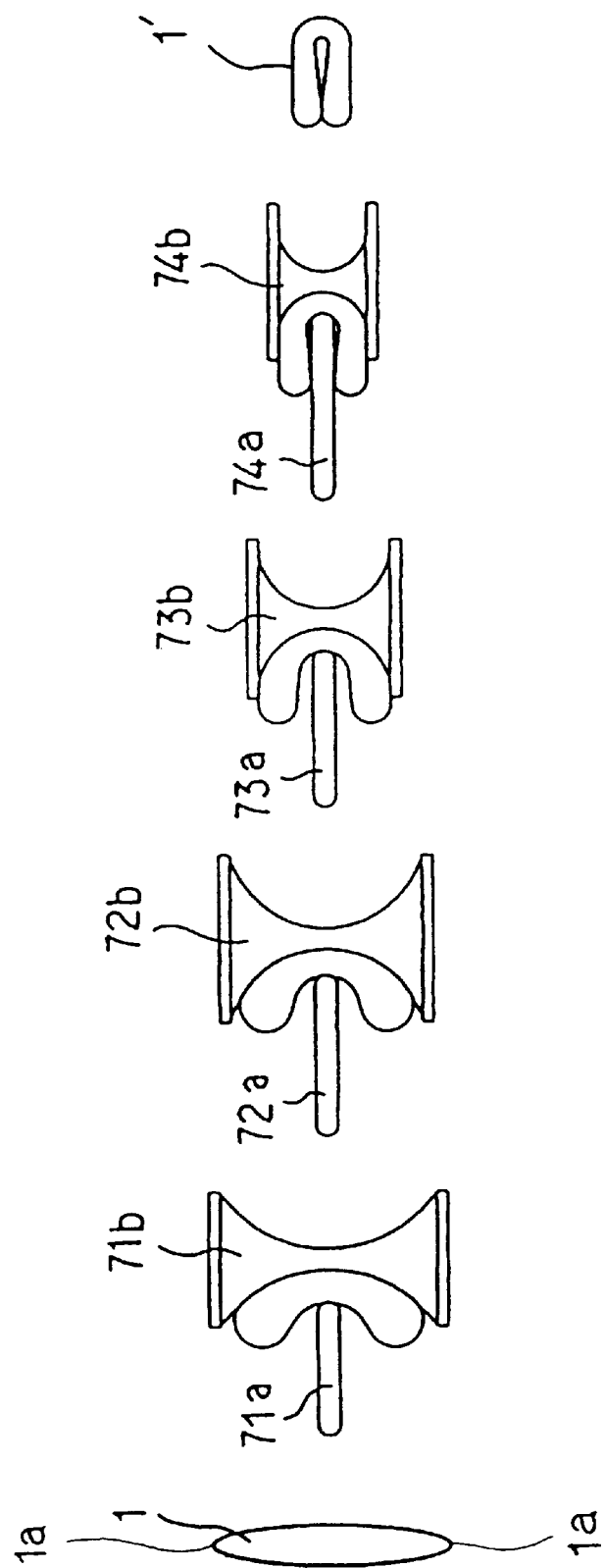
FIG. 3 is a diagram for schematically illustrating how to fold a pipe from a flat tubular form to a U shape.

With reference to FIGS. 2 and 3, the deformation zone A has a plurality of, e.g., four, rolling devices 71 to 74 arranged side by side along the direction of movement of the pipe 1.

As seen in FIG. 3, the pipe 1 passes between rolls 71a and 71b, between rolls 72a and 72b, . . . of these rolling devices 71 to 74, and is progressively deformed during the passage and eventually made into a U-shaped folded pipe 1'.

The pipe 1 is passed through a heat-insulating duct 10 until the pipe reaches the deformation zone A and is deformed within a heat-insulating hood 11 so that the pipe 1, especially the outer layer portion thereof, is held satisfactorily softened until the pipe 1 is completely deformed.

The interior of the heat-insulating hood 11 is in communication with the interior of the heat-insulating casing 4 through the duct 10 and holds therein a heat-insulated atmosphere of hot air flowing in from the casing 4.

Upon passing through the deformation zone A, the U-shaped folded pipe 1' enters the restricting-cooling zone B, which is provided with a shape restricting device 8 and a forced cooling device 9. While passing through the zone B, the U-shaped folded pipe 1' is forcedly cooled with its shape restricted.

The shape restricting device 8 comprises a multiplicity of nipping rolls 8a, . . . arranged side by side along the direction of movement of the pipe 1'. While the pipe 1' passes between each pair of opposed rolls 8a, the U-shaped portion of the pipe 1' is held between the nipping rolls 8a from opposite sides as shown in FIG. 2-a and has its shape restricted. Guide rolls 8b for preventing deflection are provided along the row of the nipping rolls 8a, for example, at the starting end, intermediate portion and terminating end of the row, i.e., at three locations.

The forced cooling device 9 is provided approximately over the entire length of the forced cooling zone B and comprises a cooling unit 9a of the cooling water jet type and/or a cooling unit 9b of the cooling air jet type. FIGS. 1 and 2 show these units as used in combination. If forcedly cooled to excess, the pipe 1' is exceedingly reduced in flexibility, possibly failing to pass through bends of the channel. For example when the pipe is made of polyethylene, it is suitable to effect forced cooling to such an extent that the pipe outer surface is given a temperature of 40±10° C. at the channel inlet. To maintain the pipe outer surface in the above temperature range, steam may be passed through the pipe 1' in the coldest season or in a cold climate.

The pipe 1' is hardened by forced cooling with its shape restricted, whereby the tendency to restore itself to the initial shape is eliminated. Incidentally, when made of polyethylene, the pipe remains somewhat elastic even in a thermally softened state, exhibiting a strong tendency to restore the undeformed shape upon being released from the restraint of the deforming step, whereas the restoring tendency can be obviated almost completely by forcedly cooling the outer surface with the shape restricted. Hardening the pipe 1' in the U-shaped folded shape remarkably reduces the resistance to be encountered in inserting the pipe into the channel, rendering the pipe insertable more smoothly to achieve an improved work efficiency.

Figure 4:
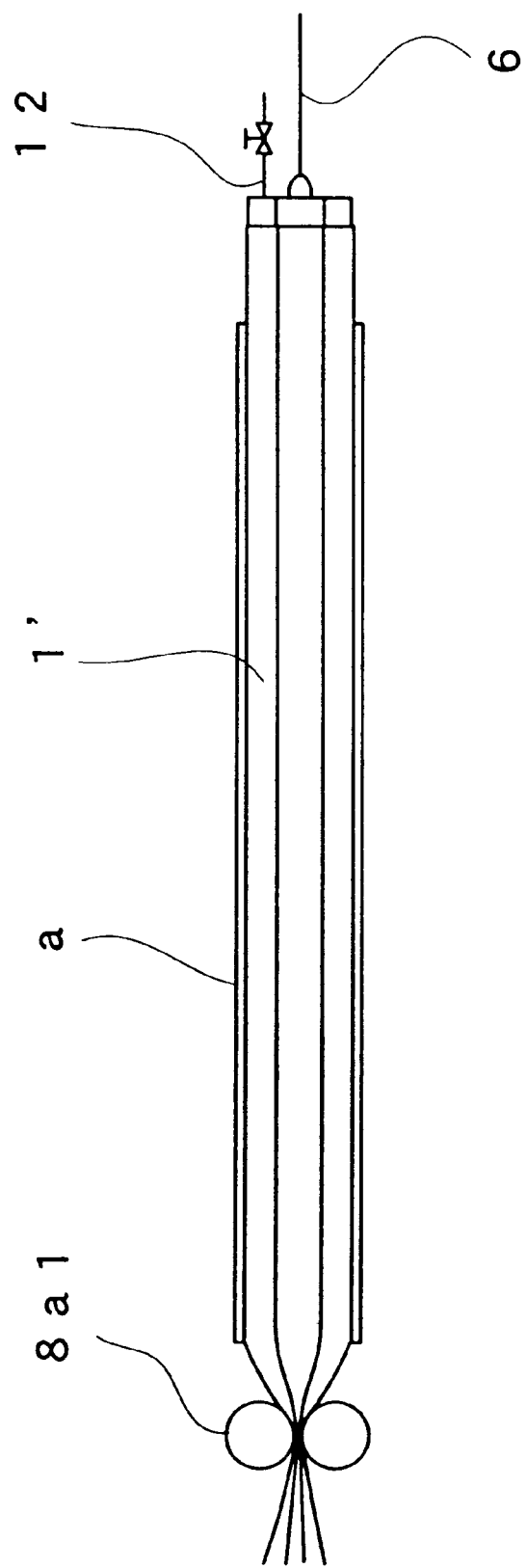
FIG. 4 is a diagram in longitudinal section schematically showing the U-shaped folded pipe as inserted in a channel.
Figure 5:
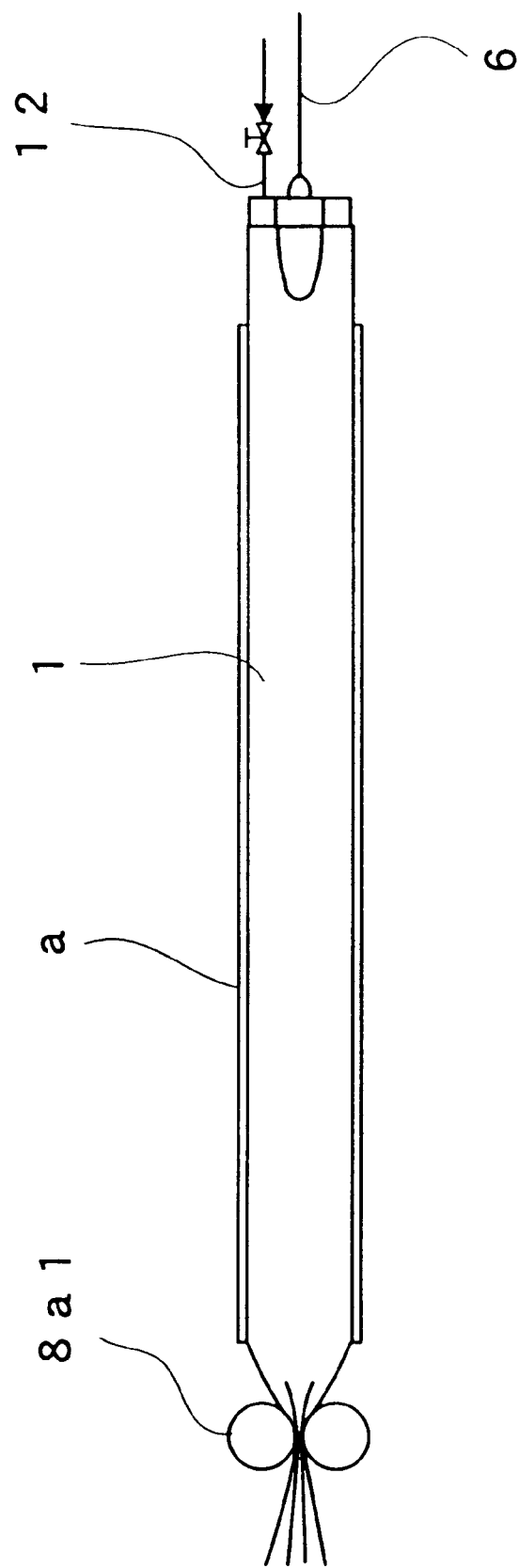
FIG. 5 is a diagram in longitudinal section schematically showing the same pipe as inflated for restoration.

After the pipe 1' has been completely inserted into the channel a, the terminal pair of nipping rolls 8a1 are forcibly moved toward each other to close the tail end of the pipe 1' as shown in FIG. 4. A heating fluid, e.g., steam, is then supplied to the pipe 1' at the leading end thereof through a heating fluid supply conduit 12 to apply heat and pressure to the pipe 1' from inside with the steam. When subjected to heat and pressure from inside with the steam, the pipe 1' is inflated and restored to the round tubular form as shaped initially, whereby a lining comprising the pipe 1 is formed inside the channel a.

Figure 6:
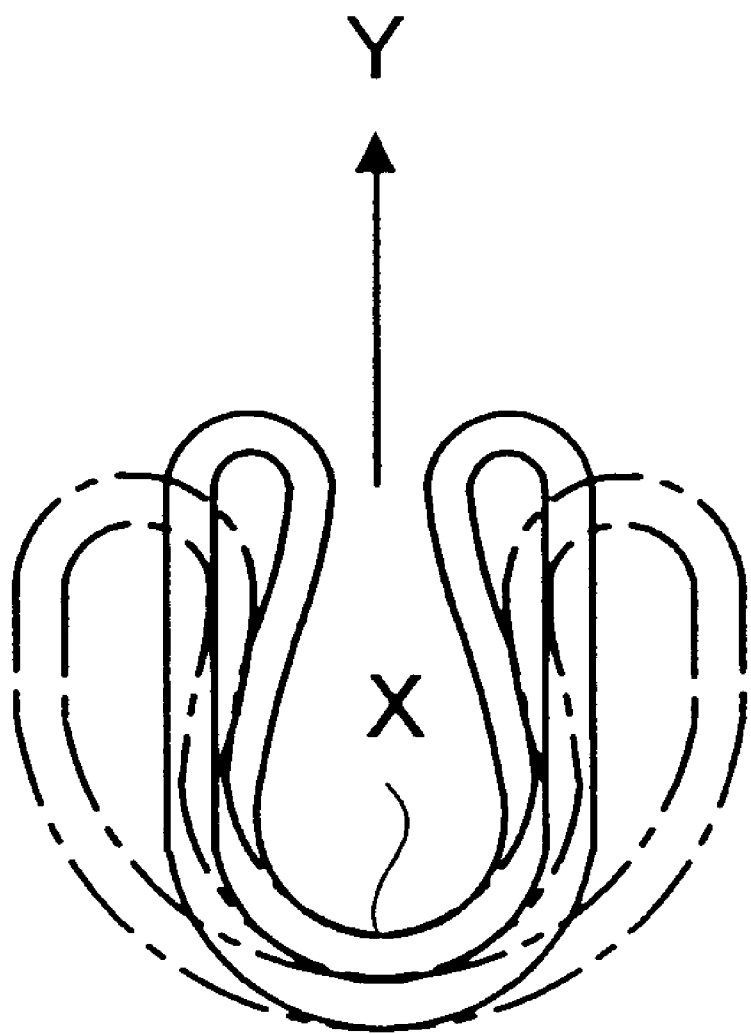
FIG. 6 is a diagram for illustrating the U-shaped folded pipe.

The U-shaped folded pipe 1' is inflated for restoration without lapse of much time after the folding step and therefore before the U-shaped folded portion develops any substantial folding tendency, so that the pipe can be restored smoothly free of trouble in its entirety including the U-shaped folded portion X (see FIG. 6), i.e., the rounded portion to be reversed. It is therefore possible to preclude minute cracking that would occur on inflation and to form a lining of high quality free of impairment.

Since the pipe 1 is wound in a flat tubular form on a roll, respective folds are formed at opposite edges 1a, 1a (see FIG. 3) of the flat portion during preservation. Owing to the folds thus formed, the pipe 1' fails to completely resume the initial round tubular form and is restored somewhat insufficiently when inflated, affording a lining 1A which tends to deform, for example, to an elliptical form although slightly as schematically shown in FIG. 7. This tendency becomes pronounced when the plastic pipe 1 has a relatively large wall thickness, for example, of 1/10 to 1/25 of its outside diameter.

In this case, the pipe 1 is shaped first in the form of an ellipse relatively close to a true circle as shown in FIG. 8, subsequently solidified by cooling and thereafter flattened along the major axis L1 in a state softened by heating. The pipe 1 then memorizes the elliptical form as shaped initially despite flattening, so that when inflated for restoration, the flattened pipe tends to restore itself to excess in the direction of the major axis, i.e., beyond a true circle. The excessive restoring tendency compensates for the insufficient restoration due to the folds, correcting deformation and forming a round tubular lining 1A free of deformation as shown in FIG. 9.

The length ratio of the major axis L1 to the minor axis L2 of the pipe of elliptical cross section, if excessively great, leads to excessive correction, permitting deformation to an elliptical form undesirably. Accordingly, the ratio of L1 to L2 is suitably determined usually from the range of 1.05–1.20:1 with consideration given, for example, to the wall thickness of the pipe 1.

Figure 10:
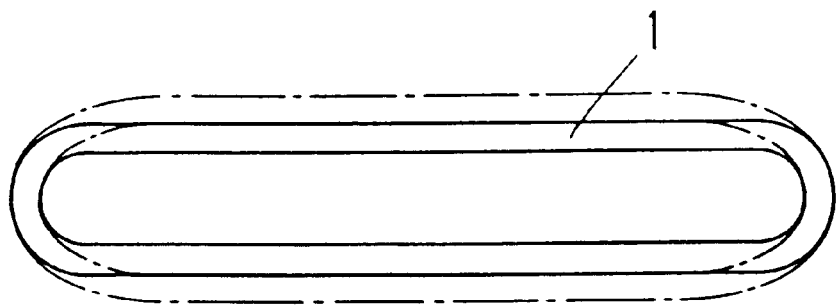
FIG. 10 is a diagram for illustrating a flat tubular pipe as inflated to an extent due to shape memory.

When the flattened pipe 1 is softened by heating so as to be unwindable from the roll 2, the pipe 1 which memorizes its form as shaped initially tends to somewhat expand from a flat state as indicated in broken lines in FIG. 10, hence reduced flatness.

Figure 11:
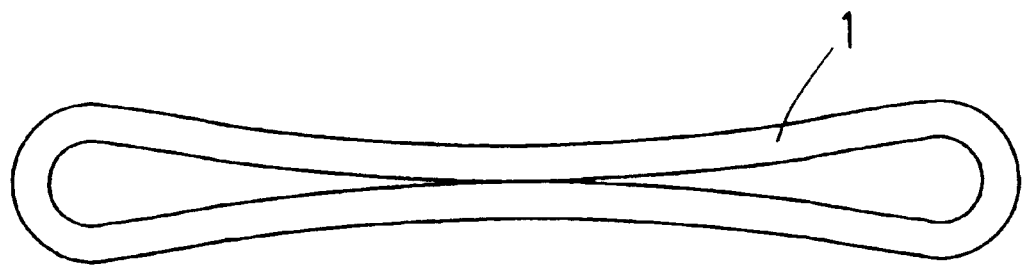
FIG. 11 is a view in vertical section showing the flat tubular pipe as deformed to an excessively flat form by a reduced pressure maintained inside thereof.

The reduction in flatness due to the shape memory can be obviated by maintaining a reduced pressure within the pipe 1 to give an increased degree of flatness as shown in FIG. 11.

Figure 12:
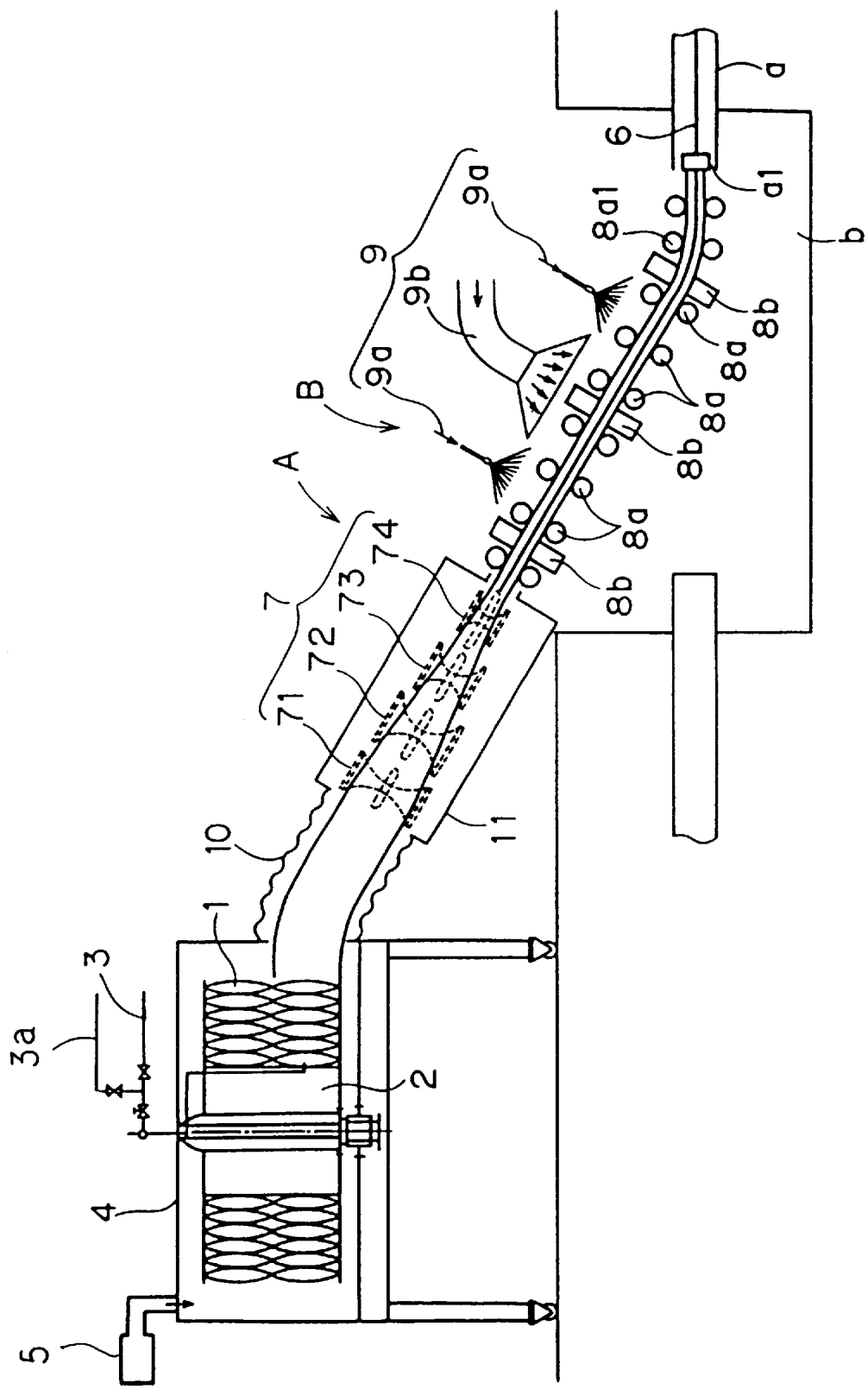
FIG. 12 is an overall diagram schematically showing the method of the invention while it is being practiced with the flat tubular pipe deformed to an excessively flat form by a reduced pressure maintained inside thereof.
Figure 13:
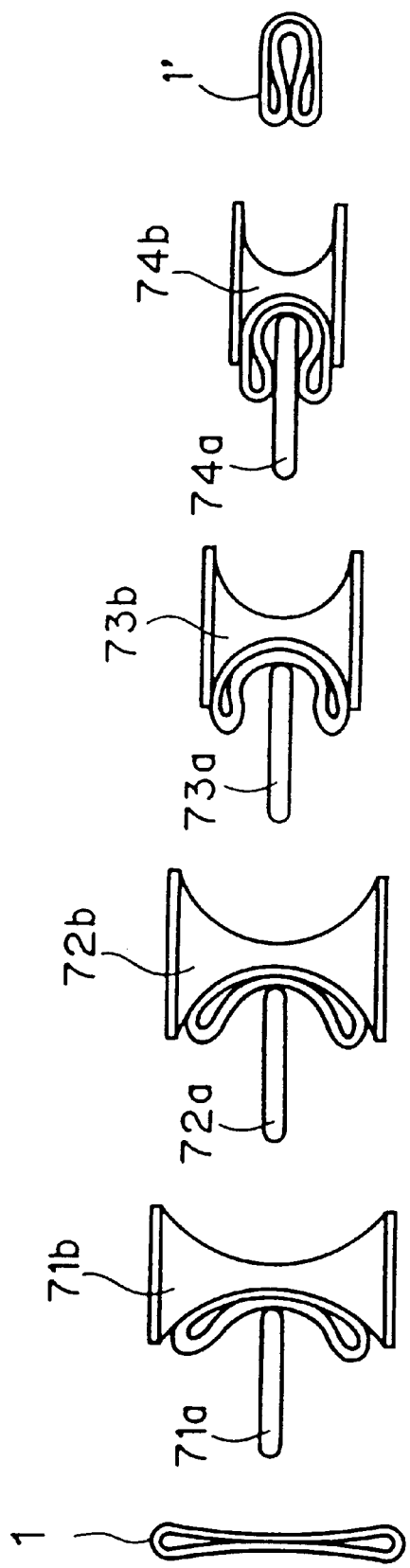
FIG. 13 is a diagram for illustrating the pipe in the excessively flat form while it is being folded to a U shape.

Stated more specifically with reference to FIG. 12, one end of the steam supply line 3 is connected to a vacuum generator (not shown) through a branch line 3a to maintain the pipe 1 at a reduced internal pressure, for example, of about 200 to 500 mm Hg after the pipe 1 has been softened by heating. The reduced internal pressure then flattens the pipe 1 to excess as seen in FIG. 11. The excessively flattened pipe 1 is folded to a U shape as shown in FIG. 13, whereby a U-shaped folded pipe 1' can be obtained as compacted. The pipe 1' can be inserted into the channel with improved smoothness.

In the case where the lining method of the present invention is to be practiced over a long distance, for example, of about 50 to about 200 m, as a single work length, the insertion of the pipe into the channel requires a considerably great force. In such a case, it is desirable to use pushing-in means at the channel inlet side in addition to the hauling means comprising a winch and usually disposed at the channel outlet side.

For example with reference to FIG. 2, the shape restricting device 8 is usable also as a pushing-in device in this case by positively rotating the component nipping rolls 8a of the device 8 in the direction of transport of the pipe 1'. However, the nipping rolls 8a are liable to somewhat collapse the U-shaped folded pipe 1' if given an increased nipping pressure, encounter difficulty in assuring the pipe 1' of shape retentivity and are therefore inherently limited in nipping pressure, hence difficulty in affording a sufficient pushing-in force, for example, due to slippage.

Figure 14:
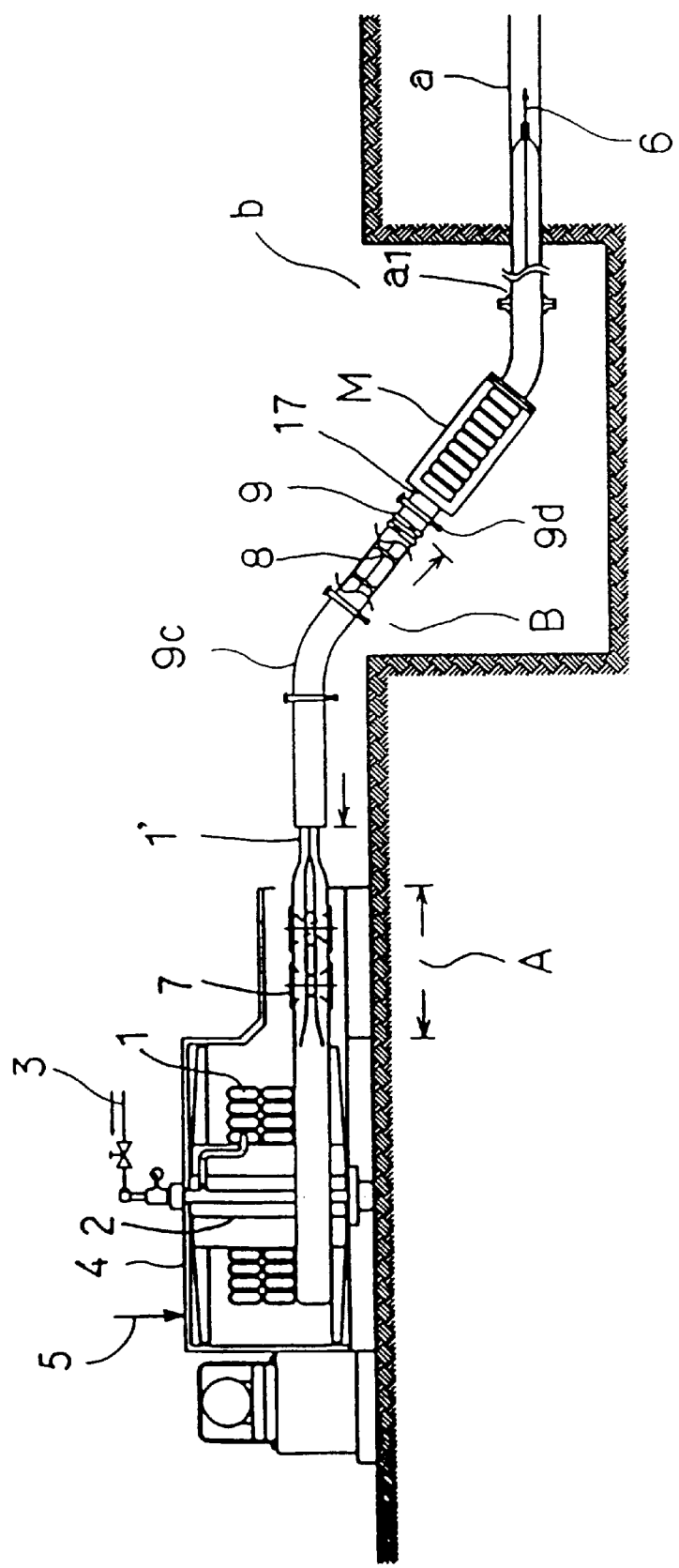
FIG. 14 is a diagram corresponding to FIG. 2 and showing an exemplary case wherein a caterpillar pushing-in device is used as means for pushing the pipe into the channel.

FIG. 14 shows a caterpillar pushing-in device M for use as an example of pushing-in means. As shown in detail in FIGS. 15 to 17, the pushing-in device M comprises a group of four caterpillar belts 13 which are arranged at an angular spacing of 90 degrees around the U-shaped folded pipe 1', for example, on the upper, lower, left and right sides of the pipe, i.e., at four locations. The pair of upper and lower belts 13, 13 are arranged on the U-shaped folded portion of the pipe 1' and on opposite side thereof. The pair of left and right belts 13, 13 are arranged on the respective lateral sides of the U-shaped pipe.

Each caterpillar belt 13 is reeved around a pair of pulleys 14, 14', run in this state in circulation by the operation of a drive unit 15 mounted on one of the pulleys 14, and turned by the pulleys 14, 14' to provide inner and outer straight running portions 16a, 16b, the inner 16a of which faces the folded pipe 1'. The upper, lower, left and right inner straight running portions 16a cooperate to form the upper, lower, left and right side walls of a generally rectangular quadrilateral passageway 17 (see FIGS. 16 and 17). The U-shaped folded pipe 1' is confined into the passageway 17 surrounded by the upper, lower, left and right side walls, whereby the shape of the pipe 1' can be restricted.

The inner and outer straight running portions 16a, 16b are supported on the back side thereof by a pair of inner and outer guide rails 18a, 18b so as not to slacken during running.

Of the inner and outer guide rails 18a, 18b, the outer guide rail 18b is fixed, while the inner guide rail 18a is movable. The outer guide rail 18b supports the inner guide rail 18a at at least two portions along the lengthwise direction thereof by adjusting screws 19, 19 (see FIG. 16). The inner guide rail 18a is movable toward or away from the folded pipe 1' relative to the outer guide rail 18b by rotating the screws 19,19.

Figure 15:
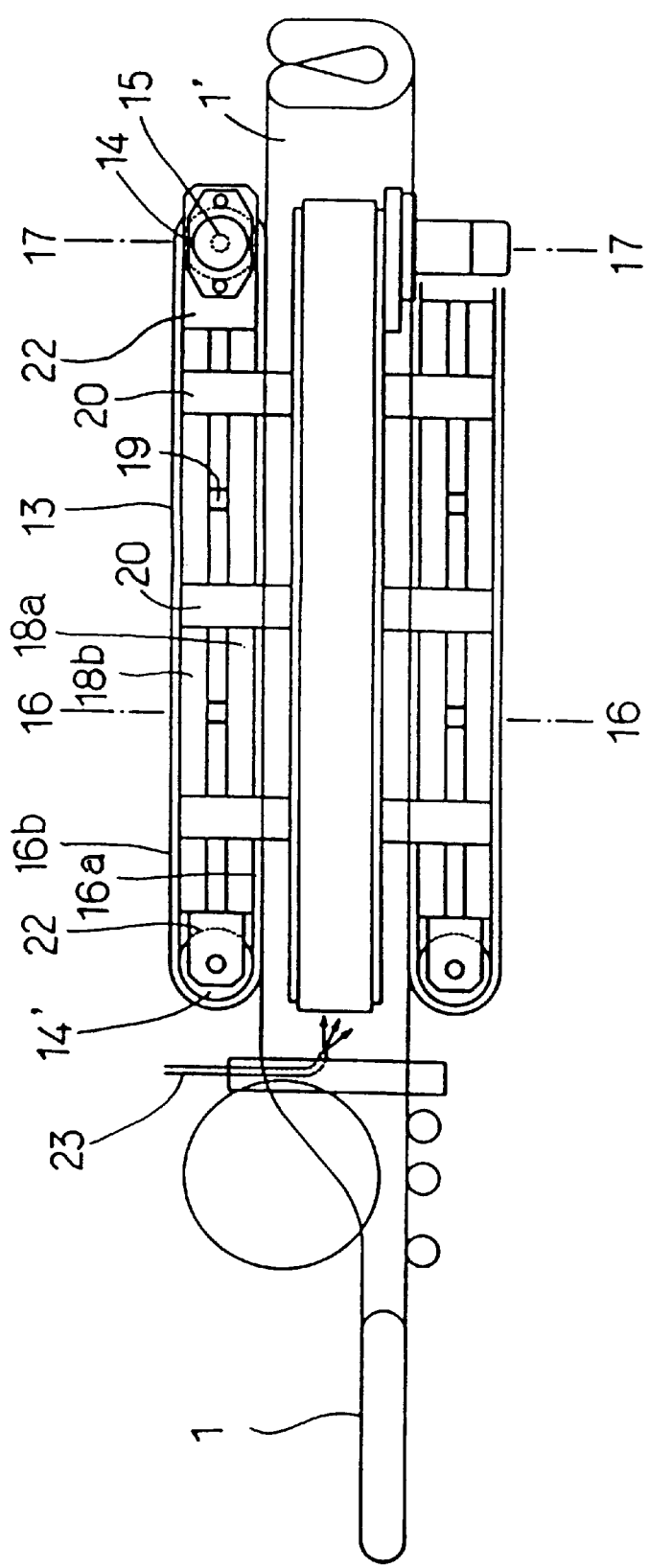
FIG. 15 is a side elevation for illustrating the construction of the pushing-in device.
Figure 16:
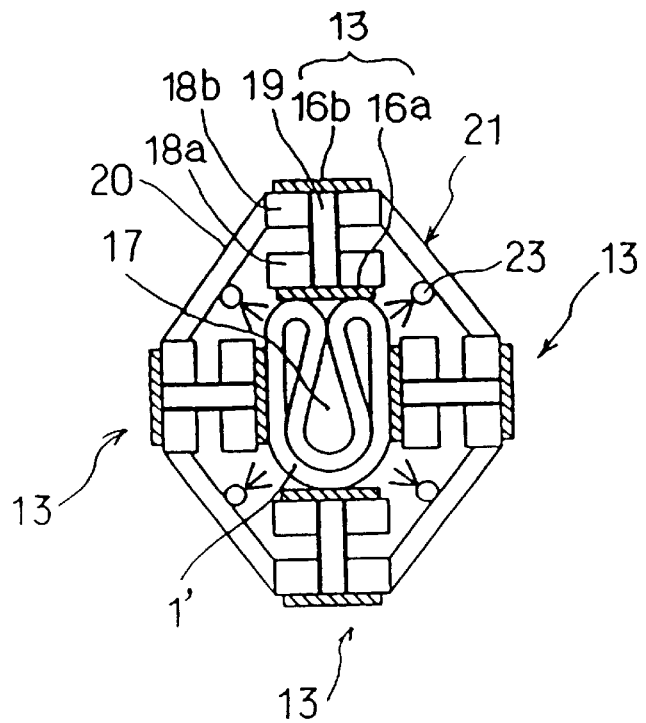
FIG. 16 is a view in vertical section taken along the line 16—16 in FIG. 15.
Figure 17:
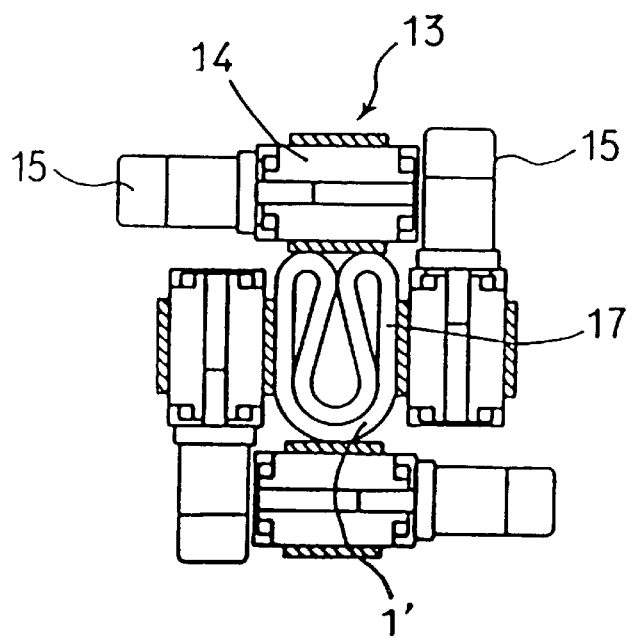
FIG. 17 is a view in vertical section taken along the line 17—17 in FIG. 15.

As shown in FIG. 16, the outer guide rails 18b are arranged above and below the U-shaped folded pipe 1' and at left and right thereof, i.e., at four locations, and are interconnected in this arrangement by connecting members 20, for example, at an intermediate portion and opposite side portions, i.e., at three positions (see FIG. 15) to provide a support frame 21 for the caterpillar belts 13. The pulleys 14, 14' arranged at the turning points of each caterpillar belt 13 are fixedly supported by support members 22 (see FIG. 15) on the outer guide rail 18b in close proximity thereto, and made free from the inner guide rail 18a.

When the U-shaped folded pipe 1' is to be paid off and hauled, the adjusting screws 19, 19 are turned to retract each inner guide rail 18a from the normal position toward the outer guide rail 18b, whereby the passageway 17 surrounded by the inner straight running portions 16a, . . . are slightly enlarged. The pipe 1' is inserted through the enlarged passageway 17.

After the insertion, the adjusting screws 19, 19 are turned to inwardly advance the inner guide rails 18a, which in turn similarly move the inner straight running portions 16a into pressing contact with the U-shaped folded pipe 1'.

As schematically shown in FIG. 14, the pipe 1' moves out of the deformation zone A into the passageway 17 of the pushing-in device M by way of the shape restricting-cooling zone B. The pipe 1' within the passageway 17 is held by the straight running portions 16a of the group of four caterpillar belts 13 arranged around the pipe, approximately over the entire periphery of the pipe as seen in FIG. 16. Accordingly, the folded pipe 1' is unlikely to collapse in cross sectional shape even if subjected to an increased nipping pressure and can be paid off and hauled under a great nipping pressure. Moreover, the caterpillar belts 13 serving as nipping means afford a great nipping area, enabling the entire belt assembly to give a great paying-off hauling force.

FIG. 14 shows a forced cooling device 9 which comprises an air duct 9c and a supply portion 9d for supplying water mist-containing air to the duct 9c. While traveling through a shape restricting device 8 disposed within the duct 9c, the U-shaped folded pipe 1' comes into contact with the water mist-containing air flowing through the duct 9c, permitting deposition of the water mist on the pipe 1'. The deposited water mist deprives the pipe 1' of heat on vaporization, so that the pipe 1' can be forcedly cooled by this type of cooling device using a reduced amount of cooling water.

The pushing-in device M of the foregoing construction holds the U-shaped folded pipe 1' from therearound over the entire periphery thereof by the straight running portions 16a of the caterpillar belts 13. The pushing-in device M is therefore usable also as a shape restricting device for the pipe 1'. Accordingly, the shape restricting-cooling zone B can be dispensed with by providing a cooling fluid injector 23 on the pushing-in device M as seen in FIG. 16.

Figure 18:
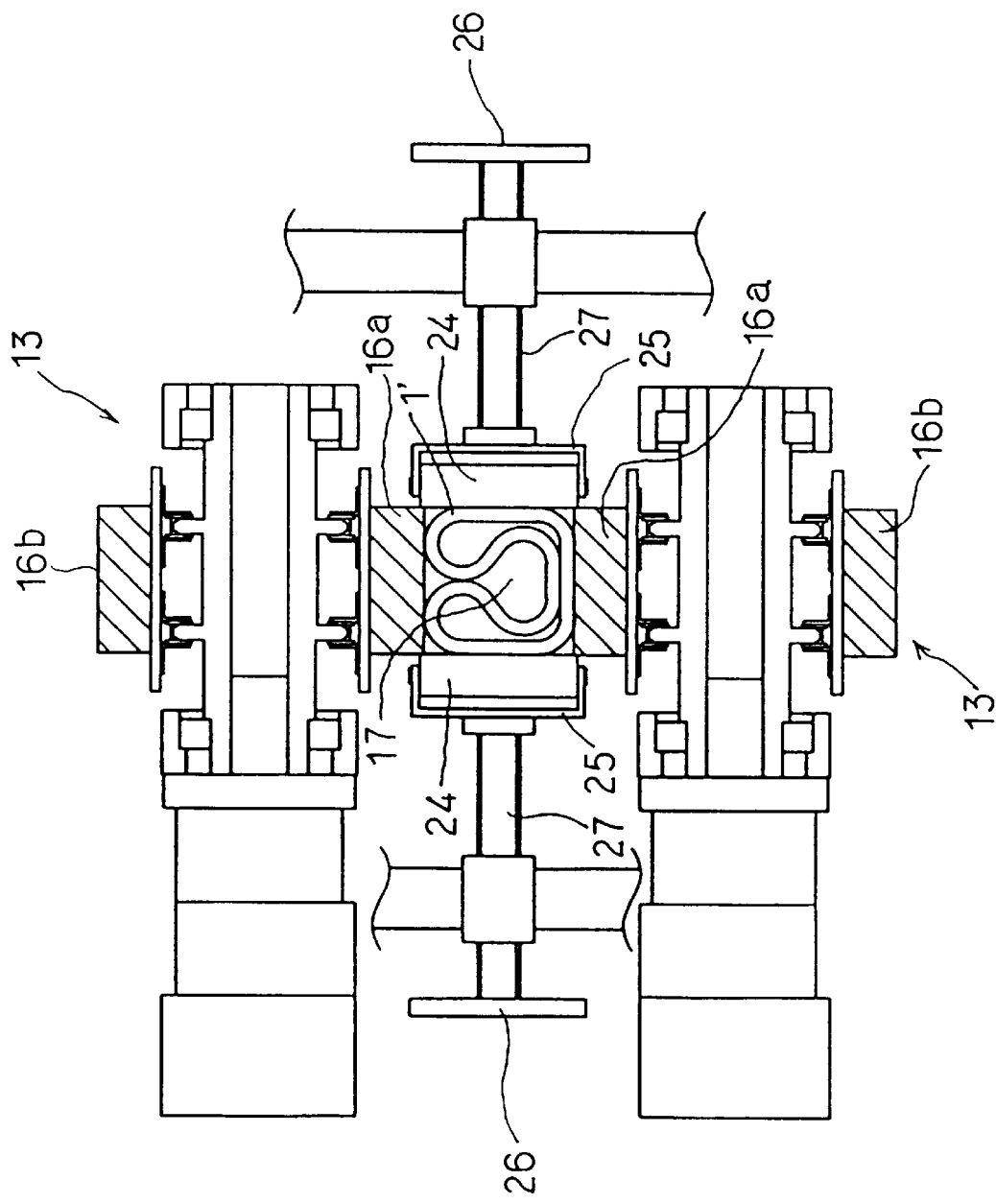
FIG. 18 is a view in vertical section showing a modification of the device shown in FIG. 15.

According to the invention, as shown in FIG. 18, one pair of side walls, e.g., the upper and lower side walls, of the passageway 17 may be provided by the inner straight running portions 16a of respective caterpillar belts 13, with the other pair of side walls, e.g., the left and right side walls, by guide rolls 24. A multiplicity of guide rolls 24 are arranged side by side along the direction of travel of the U-shaped folded pipe 1' at each lateral side over a distance approximately equal to the length of the inner straight running portion 16a of the belt 13.

The group of guide rolls 24 are supported by a frame 25. Left and right like frames 25, 25 are advanced or retracted leftward or rightward by moving respective handles 26, 26 through screw rods 27, 27 on the principle of screw feeding, whereby the distance between the opposed frames 25, 25, i.e., between the opposed groups of guide rolls 24, 24 supported by the frames, is adjustable.

The groups of guide rolls 24, 24 hold the U-shaped folded pipe 1' therebetween from the left and right sides to function solely as shape restricting means. During the travel of the pipe 1', the guide rolls are rotated by frictional contact with the pipe 1', acting to diminish the frictional resistance.

In cross section, the U-shaped folded pipe 1' confined in the passageway 17 is in the form of a slightly vertically elongated rectangle as shown in FIGS. 15 and 16 or substantially in the form of a square in FIG. 18. The square form is most desirable in view of the buckling resistance to be offered in pushing in the pipe and the bend radius of the folded pipe portion.

What is claimed is:

1. A method of lining a channel including the steps of:
    installing at a work sites a roll having wound thereon a rigid or semirigid plastic pipe shaped initially in the form of an elliptical tube and deformed and flattened along the major axis of the elliptical tube from the initial form to a flat tubular form,
    paying off the pipe from the roll as the pipe is softened by heating installed at the work site toward an inlet of the channel to be lined, and
    folding the paid-off flat pipe in two to a U shape at a position between the roll and the channel inlet,
    the lining method being characterized in that the U-shaped pipe is hardened by forced cooling from outside immediately after the folding step while being restricted in shape, then inserted into the channel while being thus hardened and thereafter shaped into a round tube, which is substantially free of deformation, by being inflated with heat and pressure applied from inside.

2. A lining method according to claim 1 characterized in that a polyethylene or other polyolefin pipe is used as the plastic pipe.

3. A lining method according to claim 1 characterized in that the plastic pipe is shaped in the form of an ellipse and flattened along the major axis of the ellipse while memorizing the elliptical form as shaped initially.

4. A lining method according to claim 3 characterized in that the elliptical plastic pipe is 1:1.05–1.20 in the length ratio of the minor axis to the major axis.

5. A lining method according to claim 1 characterized by softening the flat tubular plastic pipe by heating, and thereafter maintaining the pipe at a reduced internal pressure to thereby extensively flatten the pipe prior to folding the extensively flattened pipe to a U shape, wherein by a reduced pressure, the walls of the pipe are in contact in an area of bending where the pipe is folded to a U shape.

6. A lining method according to claim 1 characterized in that the U-shaped folded pipe is inserted into the channel by using a hauling device at an outlet side of the channel and using a caterpillar pushing-in device at the channel inlet side, wherein
    the pushing-in device comprises a pair of upper and lower side walls and a pair of right and left side walls,
    at least one pair of the upper and lower side walls or the right and left side walls comprise a pair of caterpillar belts which can be driven, and
    the U-shaped folded pipe is supported by the upper, lower, right, and left side walls and transferred while maintaining the U shape.

7. A lining method according to claim 6 characterized in that the caterpillar pushing-in device has a passageway for passing therethrough the U-shaped folded pipe with its shape restricted, the passageway having a pair of upper and lower side walls and a pair of left and right side walls, each side wall of at least one of the pairs comprising an inner straight running portion of a caterpillar belt, the inner straight running portions of said one pair being cooperative to nip the folded pipe therebetween from opposite sides, the folded pipe as nipped being pushable into the channel as the caterpillar belts travel in circulation.

8. A lining method according to claim 7 characterized in that the side walls of the pairs each comprise the inner straight running portion of the caterpillar belt.

9. A lining method according to claim 7 characterized in that each side wall of one of the pairs comprises the inner straight running portion of the caterpillar belt, each side wall of the other pair comprising a multiplicity of guide rollers arranged side by side in the direction of travel of the belt.

* * * * *